United States Patent
Kraus (10) Patent No.: US 11,356,032 B2
(45) Date of Patent: Jun. 7, 2022

(54) OPERATION OF SWITCHING ELEMENTS OF A MULTILEVEL ENERGY CONVERTER

(71) Applicant: Siemens Aktiengesellschaft, Munich (DE)

(72) Inventor: Ludwig Kraus, Ruhstorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/424,390

(22) PCT Filed: Dec. 17, 2019

(86) PCT No.: PCT/EP2019/085600
§ 371 (c)(1),
(2) Date: Jul. 20, 2021

(87) PCT Pub. No.: WO2020/151883
PCT Pub. Date: Jul. 30, 2020

(65) Prior Publication Data
US 2022/0094278 A1    Mar. 24, 2022

(30) Foreign Application Priority Data
Jan. 22, 2019  (EP) ..................................... 19153054

(51) Int. Cl.
*H02M 7/483*  (2007.01)
*H02M 1/32*   (2007.01)
(Continued)

(52) U.S. Cl.
CPC ........... *H02M 7/483* (2013.01); *H02M 1/327* (2021.05); *H02M 7/537* (2013.01); *H02M 7/539* (2013.01); *H02P 27/14* (2013.01)

(58) Field of Classification Search
CPC ............................... H02M 1/327; H02P 27/14
See application file for complete search history.

(56) References Cited

U.S. PATENT DOCUMENTS 5,321,599 A * 6/1994 Tanamachi ............ H02M 7/487
363/41
9,030,854 B2 * 5/2015 Escobar .................. H02M 7/42
363/40
(Continued)

FOREIGN PATENT DOCUMENTS

EP   2 849 331 A1   3/2015
EP   2 899 870 A2   7/2015
(Continued)

OTHER PUBLICATIONS

Binbin Li et al: "An Improved Circulating Current Injection Method for Modular Multilevel Converters in Variable-Speed Drives", IEEE Transactions on Industrial Electronics., Bd. 63, Nr. 11, Selten 7215-7225, XP055600388, USA—ISSN: 0278-0046, DOI: 10.1109/TIE.2016.2547899; the whole document; 2016.
(Continued)

*Primary Examiner* — Yusef A Ahmed
(74) *Attorney, Agent, or Firm* — Henry M. Feiereisen LLC (57) ABSTRACT

A method for operating switching elements of a multilevel energy converter using at least three electric potentials and to which a multiphase electrical machine is connected. Switching elements of the multilevel energy converter are operated in a predefined clock mode by corresponding switching signals. The switching signals for the switching elements are each assigned to one of the phases and are determined in accordance with each desired voltage signal, in order to apply a phase voltage to each phase of the multiphase electrical machine. The switching signals are determined additionally in accordance with a predefined overlaying voltage signal such that an overlaying voltage dependent on the overlaying voltage signal is overlaid onto each phase voltage.

9 Claims, 7 Drawing Sheets

(51) Int. Cl.
  *H02P 27/14* (2006.01)
  *H02M 7/537* (2006.01)
  *H02M 7/539* (2006.01)

(56) References Cited

U.S. PATENT DOCUMENTS

| | | | |
|---|---|---|---|
| 9,274,159 B2* | 3/2016 | Wang | B60L 3/12 |
| 2003/0165071 A1* | 9/2003 | Bernet | H02M 7/487 |
| | | | 363/137 |
| 2005/0071090 A1* | 3/2005 | Katou | H03K 17/0826 |
| | | | 702/34 |
| 2008/0186751 A1* | 8/2008 | Tokuyama | H02M 7/537 |
| | | | 363/131 |
| 2009/0001915 A1* | 1/2009 | Welchko | H02P 27/06 |
| | | | 318/461 |
| 2011/0141786 A1* | 6/2011 | Shen | H02M 7/487 |
| | | | 363/131 |
| 2011/0310585 A1* | 12/2011 | Suwa | H01L 24/36 |
| | | | 361/820 |
| 2012/0281442 A1* | 11/2012 | Revelant | H02M 7/487 |
| | | | 363/40 |
| 2013/0176757 A1* | 7/2013 | Morati | H02J 3/1842 |
| | | | 363/71 |
| 2013/0278229 A1* | 10/2013 | Chai | H02P 9/08 |
| | | | 322/94 |
| 2014/0140112 A1* | 5/2014 | Zhou | H02M 1/126 |
| | | | 363/40 |
| 2015/0070947 A1* | 3/2015 | Heikkila | H02M 1/44 |
| | | | 363/40 |
| 2015/0303819 A1* | 10/2015 | Qu | H02M 7/487 |
| | | | 363/35 |
| 2015/0303826 A1* | 10/2015 | Arnedo | H02M 7/537 |
| | | | 363/97 |
| 2016/0311645 A1* | 10/2016 | Agirman | B66B 1/308 |
| 2016/0315558 A1* | 10/2016 | Lee | H02M 7/537 |
| 2016/0373047 A1* | 12/2016 | Loken | H02P 29/68 |
| 2017/0170715 A1* | 6/2017 | Sathik | H02H 3/38 |
| 2019/0187081 A1* | 6/2019 | Takakura | H02P 29/68 |
| 2020/0251981 A1* | 8/2020 | Thompson | H02M 1/32 |
| 2021/0211084 A1* | 7/2021 | Kinjo | H02M 1/08 |

FOREIGN PATENT DOCUMENTS

| | | |
|---|---|---|
| WO | WO 2002-023703 A1 | 3/2002 |
| WO | WO 2019/137916 A1 | 1/2019 |

OTHER PUBLICATIONS

PCT International Search Report and Written Opinion of International Searching Authority dated Mar. 9, 2020 corresponding to PCT International Application No. PCT/EP2019/085600 filed Dec. 17, 2019.

* cited by examiner

OPERATION OF SWITCHING ELEMENTS OF A MULTILEVEL ENERGY CONVERTER

CROSS-REFERENCES TO RELATED APPLICATIONS

This application is the U.S. National Stage of International Application No. PCT/EP2019/085600, filed Dec. 17, 2019, which designated the United States and has been published as International Publication No. WO 2020/151883 A1 and which claims the priority of European Patent Application, Serial No. 19153954.2, filed Jan. 22, 2019, pursuant to 35 U.S.C. 119(a)-(d).

BACKGROUND OF THE INVENTION

The invention relates to a method for operating switching elements of a multilevel energy converter using at least three electric potentials, to which a multiphase electrical machine is connected, in which method switching elements of the multilevel energy converter are operated in a predefined clock mode by means of corresponding switching signals, wherein the switching signals for the switching elements that are assigned to a respective one of the phases are determined as a function of a respective desired voltage signal, in order to apply a respective phase voltage to each phase of the multiphase electrical machine. Furthermore the invention relates to a control unit for controlling switching elements of a multilevel energy converter using at least three electric potentials, which is embodied for connection to a multiphase electrical machine, wherein the control unit is embodied to operate the switching elements of the multilevel energy converter by means of corresponding switching signals in a predefined clock mode, for which purpose the control unit determines the switching signals for the switching elements assigned to a respective one of the phases as a function of a respective desired voltage signal, in order to apply a respective phase voltage to each phase of the multiphase electrical machine. Furthermore the invention relates to a multilevel energy converter, which is embodied for connection to a multiphase electrical machine and which uses at least three electric potentials, with switching elements for applying a respective phase voltage to each phase of the multiphase electrical machine, and to a control unit for controlling the switching elements in a predefined clock mode by means of corresponding switching signals. Finally the invention also relates to a drive facility with a multiphase electrical machine and a multilevel energy converter connected to the multiphase electrical machine, which uses at least three electric potentials.

Methods for operating switching elements of a multilevel energy converter, control units for said converter, multilevel energy converters with control units and also drive facilities of the generic type are widely known in the prior art, so that there is no need for separate published evidence of these. Multilevel energy converters are specific energy converters, which use a number of electric potentials for the purposes of carrying out the energy conversion function, which can be provided by one or more DC link circuits for example. The invention is directed in particular to such multilevel energy converters, which use at least three electric potentials in order to realize the desired energy conversion function.

These types of multilevel energy converter are frequently employed in the area of energy supply or in power drives. Preferably such multilevel energy converters are operated bidirectionally, so that electrical energy can be converted both from the AC voltage side to the DC voltage side and also vice versa.

A multilevel energy converter is known for example from WO 02/23703 A1.

US 2005/071090 A1 discloses the estimation of temperature changes in semiconductors.

The aim of EP 2 849 331 A1 is to balance the voltage over a capacitive voltage divider of a multilevel energy converter. A voltage difference at the neutral point is balanced by this.

The publication "An Improved Circulating Current Injection Method for Modular Multilevel Converters in Variable-Speed Drives" (IEEE TRANSACTIONS ON INDUSTRIAL, ELECTRON I CS., Vol. 63, No, 11, 1 Nov. 2016 (2016-11-01), pages 7215-7225, XP055600388, USA) deals with the suppression of ripple voltages in capacitors or with the reduction of the necessary capacitances of a multilevel energy converter. The aim here is to keep fluctuations of the capacitor voltage within a specific tolerance interval, for which a corresponding power exchange would be needed. A corresponding common-mode voltage is only used up to a limit frequency.

Multilevel energy converters are employed as a rule to couple one or more DC link circuits to an AC power network, in particular a multiphase AC network. Frequently the AC network is provided by a corresponding multiphase electrical machine. The multilevel energy converter is adapted in this regard to the multiphase electrical machine, so that each of the phases of the electrical machine can accordingly have electrical energy applied to it.

Multiphase electrical machines are likewise widely known in the prior art. These are used in the prior art for a plurality of applications, in which specific drive functions are to be realized by means of the multiphase electrical machine. The use of three-phase electrical machines is especially widespread, which depending on application—can even be coupled directly to a three-phase public energy supply grid in order to provide the desired drive function. The control options in this type of scenario are limited however, which is why the multiphase electrical machines are nowadays operated as a rule via respective individually assigned energy converters, in particular inverters. At the same time this allows the electrical energy required for operation of the electrical machine according to specification also to be provided from an electrical energy store, for example a battery, in particular a high-voltage battery, a photovoltaic facility and/or the like. This for example enables drive facilities to be provided, which are suitable not only for stationary applications, but also for mobile use, in motor vehicles for example. A plurality of further applications can also be realized in this way.

In particular when the multilevel energy converter is embodied as an inverter it is possible to control the multiphase electrical machine in a flexible way, and also to do so when the electrical machine has more than three phases, for example four phases, five phases, six phases or even more phases. Even if the use of three-phase machines is currently predominant or very widespread, it can be sensible, especially with specific applications, for the electrical machine to have more than three phases, thus for example in ship drives or the like. The electrical machine can be embodied for example as a synchronous machine, as an asynchronous machine or the like. Such electrical machines are embodied as a rule to have AC voltage applied to them.

The use of an inverter in particular for operating a multiphase electrical machine opens up the possibility of operating the multiphase electrical machine in a very dynamic way. The multiphase electrical machine is embodied as a rule as a rotating electrical machine, which has an armature embodied as a stator, which as a rule provides an essentially circular opening for accommodating an inductor embodied as a rotor. The rotor is arranged rotationally supported rotationally in the opening, wherein an air gap is embodied between the rotor and the stator.

The rotating electrical machine is an apparatus that transforms electrical energy into mechanical energy, in particular into motion energy when operating as a motor and/or transforms mechanical energy into an electrical energy when operating as a generator. As a rule the motion involves a rotating motion that the rotor carries out. The stator, by contrast with the rotor, is as a rule arranged so that it does not rotate, meaning that a rotating motion involves a rotating movement of the rotor hi relation to the stator.

The stator and the rotor of the rotating electrical machine are linked by means of a magnetic flux, whereby, during operation as a motor, the force effect or the torque is created, which drives the rotor rotationally in relation to the stator. In generator mode mechanical energy or a torque supplied to the rotor in the form of a rotation is converted into electrical energy. For this purpose the stator has a corresponding multiphase winding in each case, through which respective phase currents flow. In the stator or in the rotor the winding can also be replaced or at least partly supplemented by a permanent magnet.

Rotating electrical machines of the generic type are for example rotating field machines, which are connected to a corresponding multiphase, in particular three-phase, electrical AC power network, for example asynchronous machines, synchronous machines, synchronous machines with a damper cage or the like. The AC power network is preferably provided by the inverter.

As a rule the stator and the rotor have a magnetically active unit, which as well as the respective windings, can also comprise at least respective laminated cores. A laminated core is embodied as a rule from individual ferromagnetic laminations electrically insulated from one another. The laminations, depending on the purpose for which they are used, can be referred to as dynamo laminations, motor laminations, transformer laminations or the like. Such laminations are subject to standardization, for example EM 10106, EM 10107 or the like.

During the operation of inverters, in particular when they are embodied as multilevel energy converters, losses arise, including those caused by the switching operation of the switching elements. What is more, forward power losses also occur in the switching elements when they are in the switched-on switching state and a respective electrical current is applied to them. The switching signals for controlling the switching elements are frequently created and provided as part of pulse width modulation (PWM) by means of a control unit. The control unit can be included in the respective multilevel energy converter. It can however also be provided, at least in part, by a higher-ranking controller, for example a controller of the drive facility or the like.

In pulse width modulation, in a short period of time in relation to a basic oscillation period or a clock rate, also called a PWM period, two DC voltage potentials are provided in a temporal ratio of this type (pulse duty factor) as a switching signal, which corresponds to the voltage averaged over the PWM period of for example a desired phase voltage at a respective point in time of the PWM period. The respective phase current is set accordingly.

The time curve of the aforementioned average value of the respective phase voltage is definitive for the embodiment of a respective phase current in relation to a basic oscillation of the frequency of the phase voltage.

Multilevel energy converters, in which a respective phase connection can be coupled to one of three electrical potentials by means of respective switching elements, are known as three-level inverters or also three-point inverters.

The phase current can be embodied according to the difference between the phase voltage provided by the energy converter and an inner voltage of the electrical machine. The nearer a current value lies to a respective phase voltage for one of the electrical potentials available, the longer the respective phase connection in a corresponding PWM period is connected to this electrical potential, if for example small phase voltages are provided, the result can be a lasting proximity with relation to the middle electrical potential in a three-point inverter. Therefore in an operating state of this type a so-called midpoint path, i.e., the switching element between the phase connection and the average of the electrical potentials of the inverter, can be switched on for a comparatively long time. Large forward power losses can arise thereby. In addition however switching losses because of the necessary switching processes to the respective other electrical potentials are to be taken into consideration.

In many practical applications, for example in the use of asynchronous machines, there exists an approximately proportional relationship between a respective phase voltage in relation to the basic oscillation and the respective frequency of the basic oscillation. In particular this can then lead, at low phase voltages, to the corresponding frequency also being low, meaning that a duration of the basic oscillation period is correspondingly long. This can lead to the forward power losses in the midpoint path being able to occur over a long period in relation to a plus path and/or a minus path and in this way can lead to a high thermal stress and also to correspondingly large temperature changes of the switching elements of the midpoint path concerned.

A switching element in the sense of this publication in this case is preferably a controllable electronic switching element, for example a controllable electronic semiconductor switch such as a transistor, which is operated in a switching mode, a thyristor, combination circuits thereof, preferably with parallel-switched inverse diodes, a Gate Turn Off Thyristor (GTO), an Insulated Gate Bipolar Transistor (IGBT), combinations hereof or the like. Fundamentally however the switching element can also be formed by a field effect transistor, in particular a Metal Oxide Semiconductor Field Effect Transistor (MOSFET).

To provide the desired energy conversion functionality of the multilevel energy converter or of the inverter the switching elements are operated in switching mode. In relation to a semiconductor switch using a transistor, switching mode means that, in a switched-on switching state between the gates of the transistor forming a switching path, a very small electrical resistance is provided, so that a high current flow with very small residual voltage is possible. In a switched-off switching state on the other hand the switching path of the transistor is at high resistance, meaning that it provides a high electrical resistance, so that even with a high electrical voltage present on the switching path, essentially there is no or only very low, in particular negligible, current flow. This is different from a linear operation with transistors, which however is not used as a rule in multilevel energy converters or inverters of the generic type. When switching from the switched-on to the switched-off switching state the current flowing via the switching element must fall and the voltage present at the switching element must rise. The simultaneous occurrence of voltage and current causes an energy loss to arise during this transition time.

Energy loss likewise arises on transition from the switched-off to the switched-on switching state.

For realizing the switching functionality the switching element has at least one control connection, at which a switching signal provided by the clock generator is able to be applied to it, so that the desired switching function of the switching element can be realized. The switching signal can be a binary switching signal, which can assume two state values in order to be able to provide the desired switching functions of the switching element. For example the switching signal can be formed by a pulse sequence, by means of which it is applied to the control connection. This is expedient above all with thyristors and GTOs. What is more, with transistors there can be provision for the switching signal to be embodied as a square-wave signal, wherein a respective switching state of the switching element can be assigned to one of the electrical potentials of the square-wave signal. Such a signal is for example expedient for transistors, in particular for bipolar transistors, field effect transistors or the like. A temporal relationship between the two electrical potentials determines the pulse duty factor as a rule.

The control unit provides the functionality in relation to the creation of the switching signals. Further functions, in particular in relation to operating the multilevel energy converter or inverter, can also be realized by the control unit, for example monitoring functions, safety functions and/or the like. For this purpose the control unit can comprise a hardware circuit and/or a programmable processor unit or the like. Naturally the control unit can be embodied as a separate module. The control unit can however also be included at least in part in the higher-ranking controller, for example a controller for the drive facility or the like.

The multilevel energy converter is formed by an electronic hardware circuit, which has switching elements according to the number of phases of the multiphase electrical machine, by means of which one of the phases of the electrical machine can be electrically coupled to the respective electrical potentials of the multilevel energy converter. For this purpose the multilevel energy converter has corresponding phase connections, to which the electrical machine can be connected. Through suitable pulse patterns of the switching signals in accordance with the pulse width modulation the desired energy connection can be achieved. The underlying operating methods in this process are known, which is why no further information will be provided here in this regard. For the operation according to specification of the energy conversion the clock rate of the switching signals is as a rule significantly greater than the frequency or the basic frequency of the phase alternating currents or the phase voltages.

During operation according to specification the switching elements should not exceed a maximum dimensioned temperature. Above the dimensioned temperature the reliable operation of the switching elements can no longer be guaranteed. The result can be faults and/or failures of the switching elements.

What is more R should be noted that cyclic temperature changes can lead, even below the dimensioned temperature, to an aging of the switching elements, in particular when they are embodied as a semiconductor switching element. Such increases in temperature can accordingly occur for example during the course of a respective basic oscillation period of the frequency of the basic oscillation of the phase alternating currents or phase voltages. This too can lead to a failure of the switching elements. With a three-point inverter in particular the provision of phase voltages with small amplitude with at the same time a small basic frequency can lead to an unfavorable thermal stress on the midpoint path, so that overall the consequence is a large aging at least in relation to the midpoint path.

The underlying object of the invention is to develop a generic method, a control unit, a multilevel energy converter and also a drive facility to the extent that an improved thermal stress on the switching elements, in particular in a part load operating mode, can be achieved.

SUMMARY OF THE INVENTION

The solution proposed with the invention is a method, a control unit, a multilevel energy converter and also a drive facility in accordance with the independent claims.

Advantageous developments are produced by the features of the dependent claims.

With regard to a generic method it is proposed in particular that the switching signals be determined additionally as a function of a predefined overlaying voltage signal in such a way that the respective phase voltages are overlaid by an overlaying voltage dependent on the overlaying voltage signal.

With regard to a generic control unit it is proposed in particular that the control unit is further embodied additionally to determine the switching signals as a function of a predefined overlaying voltage signal, in order to overlay the respective phase voltages with an overlaying voltage dependent on the overlaying voltage signal.

With regard to a generic multilevel energy converter it is proposed in particular that this comprises a control unit in accordance with the invention.

With regard to a generic drive facility it is proposed in particular that this comprises a multilevel energy converter in accordance with the invention.

The invention is based on the idea that, by a potential displacement of the phase voltages, the stress on the switching elements, in particular with small amplitudes of the phase voltages and also small basic frequencies of the phase voltages or in the part load range, is better distributed to all switching elements of the multilevel energy converter. This is achieved by one of the phase voltages being overlaid with the overlaying voltage. The overlaying voltage is preferably the same size for all of the phase voltages. Since the multiphase electrical machine is as a rule connected ground-free to the multilevel energy converter, this does not need to lead to any change in respect of the operating characteristics of the electrical machine.

This principle is not restricted either to the use of three electrical potentials by the multilevel energy converter or to use in three-phase electrical machines. The multilevel energy converter can thus also use four different electric potentials, five electric potentials or even yet more different electric potentials. For the multiphase electrical machine it is likewise not a matter of the number of phases. A simple option is thus provided with the invention, with which a more even stress on the switching elements can be achieved, without further disadvantages needing to be taken into account.

For example the clock rate could also be reduced. Although the lowering of the clock rate allows switching losses of the switching elements to be reduced, it does however lead to a so-called ripple current and its effects becoming greater. The ripple current is caused by a difference between the phase voltage and the initial voltage actually provided by the multilevel energy converter or inverter within a PWM period at the respective phase connection and is overlaid on the actual phase alternating current. This can lead to higher losses, higher temperatures and noises in the connected multiphase electrical machine and also possibly to further unwanted side effects.

What is more the phase alternating current could also be reduced. Through this the forward power losses of the switching elements could be reduced as well as the switching losses. However the consequence here is naturally also a reduced power, which results in a correspondingly reduced torque at the electrical machine.

What is more clocking gaps in the switching signals could also be taken into consideration. The clocking gaps involve the intervals within a respective period of the basic oscillation or basic frequency, in which no switching processes of the switching elements are undertaken in a respective phase. For an even stress on the switching elements the clocking gaps would however have to switch cyclically between all switching elements. These types of pulse pattern are also referred to as discontinuous. It has proved disadvantageous here however that the phase alternating currents exhibit more unfavorable spectra. For example the effective frequency of a linked voltage can switch between double the pulse frequency of a respective phase, when both phases involved are switching, and the single pulse frequency when one of the two phases has a clocking gap. This causes the ripple current overlaid on the phase alternating current to increase as well.

What is more the common-mode voltage arising here as a rule has also proved disadvantageous, in which for example, after a sixth of the basic oscillation period in each case, all phase voltages can jump in relation to a reference potential such as the ground potential. These types of voltage jumps occur alternately in both directions and their height corresponds to a DC voltage and their gradient is as a rule dependent on the switching speed of the switching elements. In conjunction with parasitic capacitances, for example between the winding of the multiphase electrical machine and a grounded housing of the electrical machine, comparatively large common-mode currents can be the result, which at the same time can also result in corresponding faults in relation to electromagnetic compatibility (EMC).

These disadvantages can be avoided by the inventive method. This method exploits the fact that it is definitive for the operating behavior of multiphase electrical machines to take into account the linked phase voltages, which is why these phase voltages may be displaced by a respective equal voltage amount, without adversely affecting the correct function of the electrical machine.

Even if in the present case a sine-wave curve is provided for the phase alternating currents or the phase voltages, the invention is not restricted to this. The phase alternating currents or the phase voltages can naturally also have a respective other harmonic waveform, which can be dependent on a respective specific application.

Therefore, in accordance with the invention, the overlaying voltage signal is additionally taken into account on determining the switching signals, wherein the switching signals are determined in addition as a function of the predefined overlaying voltage signal in such a way that the respective phase voltages are overlaid with an overlaying voltage dependent on the overlaying voltage signal.

Preferably this overlaying voltage is the same size for all phase voltages, so that in particular the effects on the multiphase electrical machine can largely be kept small. The overlaying voltage signal can serve, in a switching signal unit of the control unit, which from predefined values for the phase voltages or phase alternating currents provides respective switching signals for the switching elements, to influence its pulse duty factor in such a way that, at the respective phase connections of the multilevel energy converter, the respective phase voltages overlaid with the overlaying voltage are provided. This enables the problem described at the start in respect of the unfavorable stress, in particular in relation to a midpoint path in a three-point inverter, to be reduced, because through the displacement of the respective phase voltages as a result of the overlaying voltage, the stress is at least partly relocated to the respective other paths.

Through this it is possible, in particular with small amplitudes of phase voltages and also with small basic frequencies of the phase voltages, to reduce the stress on the midpoint path. Accordingly the other paths are more heavily stressed, so that overall a more even stressing of the switching elements in relation to the thermal stress is achieved. The principle is fundamentally dependent on how many electric potentials the multilevel energy converter uses in order to realize the desired energy conversion function. Likewise the principle is naturally independent of how many phases the multiphase electrical machine has. Basically with the invention a stress on at least one individual of the potentials can be at least partly displaced to other potentials.

Thus, what can be achieved by the invention is that the switching elements of the multilevel energy converter are more evenly stressed overall, so that as well as a greater stress on the multilevel energy converter as a whole, an aging of the switching elements overall and thus also of the entire multilevel energy converter can be reduced. This enables the stress capacity of the multilevel energy converter as a whole to be increased and/or its design in respect of constructional stresses to be reduced. The reliability can be increased and/or the costs can be reduced.

The phase voltages are AC voltages at the respective phase connections of the multilevel energy converter or inverter or of the electrical machine and in this case involve AC voltages at the respective phase connections of the multilevel energy converter or inverter, to which the multiphase electrical machine is connected. At least one phase connection is preferably provided here by the multilevel energy converter or the inverter for each of the phases of the multiphase electrical machine to which the respective phase of the multiphase electrical machine can be connected. At least one switching arrangement with a suitable number of switching elements is provided for each phase connection by the multilevel energy converter or the inverter, by means of which in each case the respective phase connection can be selectively coupled electrically to at least one of the electrical potentials of the multilevel energy converter or of the inverter.

As a rule the respective phase currents in relation to the multiphase electrical machine are set by suitable pulse patterns of the switching signals provided by the control unit, with which the respective switching elements are controlled. The assigned phase voltages can now be determined from these pulse patters, by for example the respective pulse pattern being filtered by means of a suitable lowpass, a Fourier transform being determined, the respective phase voltage being determined by means of a power measurement device and/or the like. The phase voltage thus does not correspond to the direct pulse pattern, which is provided directly at the respective phase connection of the multilevel energy converter or the inverter. For this reason the frequency of the basic oscillation of the respective phase voltages is as a rule far smaller than the clock rate of the switching signals, in accordance with which the respective pulse patters are provided at the respective phase connections.

In accordance with a development it is proposed that the overlaying at least occurs when a frequency of the desired voltage signals is less than a predetermined comparison frequency. The predetermined comparison frequency can for example be a frequency of around 30 Hz or less. This can take into consideration that thermal time constants of the switching elements are relatively small and a corresponding increase in temperature can already be significant for the respective switching element. Above the comparison frequency the provision of the overlaying voltage signal can be reduced or even canceled. This means that the inventive control or operation of the switching elements only needs to be provided when this proves expedient because of the operating characteristics of the multilevel energy converter, in particular of its switching elements, in operation according to specification. Since the basic frequency of the desired voltage signals as a rule essentially corresponds to the basic frequency of the phase alternating currents, the comparison frequency can naturally also be related to the basic frequency of the phase alternating currents.

In accordance with a development it is proposed that the overlaying occurs at least when an amplitude of the desired voltage signals is less than a predetermined comparison amplitude. This enables it to avoided that the electrical potentials or the switching elements electrically coupled to said potentials are especially stressed, which are relevant for the realization of the phase voltages of this type. These are preferably electric potentials or their switching elements, which are in a mid range between the maximum positive and the maximum negative electrical potential. With a three-point inverter this is preferably the mid potential or the midpoint path. Through the overlaying of the overlaying voltage the stress can thus be distributed to other electric potentials or to the switching elements assigned to said potentials. Above the comparison amplitude the control of the switching elements or the operation of the switching elements in accordance with the invention thus does not need to be realized. Naturally this development can also be combined with the previous development in relation to the frequency.

There can be provision for a separate overlaying voltage signal to be provided for each of the phases, by means of which for each of the phases amplitudes of the respective overlaying voltages are set individually. This makes it possible, for each of the phases, to set the respective overlaying voltage individually. This has the advantage that tolerances, in particular in relation to the provision of the desired voltage signals and also in relation to the electrical characteristics of the respective phases of the multiphase electrical machine, phase-specific peculiarities and/or the like can thereby be better taken into consideration or also compensated for. What is more there can naturally also be provision for further applications, wherein different phases with overlaying voltages differing from one another are applied in such a way that these can compensate for each other during operation according to specification of the drive facility. Through this specific effects can be achieved, which can be relevant for specific applications. Preferably however the overlaying voltage signals as well as the corresponding assigned overlaying voltages are essentially of the same size.

It is further proposed that temperatures of the switching elements are determined and the overlaying voltage signal is set as a function of the temperatures determined. This development has the advantage that the control of the switching elements can be specifically adapted to a respective thermal stress of the switching elements. An average even stressing of the switching elements, in particular in relation to a thermal stress, can thereby be achieved in a simple manner. The overlaying voltage or the overlaying voltage signal thus does not absolutely need to be constant, but can be varied where necessary. The overlaying voltage signal can be a DC voltage signal, wherein the amplitude of the DC voltage can be adapted where necessary. As well as the dependence on the temperature, the amplitude of the overlaying voltage signal can naturally also depend on an amplitude of the phase voltage and/or of the phase alternating current and also if necessary on a frequency, in particular of a basic oscillation, of the phase voltage or of the phase alternating current. The temperatures of the switching elements can be determined in the known way, for example by switching characteristics of the switching elements being detected or the like. Naturally there can also be provision for the switching elements to have respective temperature sensors, which are connected to the control unit and the sensor signals of which are evaluated accordingly by said unit. There can also be provision for combinations hereof.

There can furthermore be provision for aging states of the switching elements to be determined and for the overlaying voltage signal to be set as a function of the aging states determined. With semiconductor switching elements an increase in the respective temperature in particular in operation according to specification has proven to be an indication of an aging state. This can be taken into consideration additionally for provision of the overlaying voltage signal, so that where necessary different aging states of switching elements of the multilevel energy converter can also be employed for setting the overlaying alternating voltage.

The overlaying voltage signal can for example be a DC voltage signal. What is more it can naturally also be formed by an AC voltage signal. This makes it possible to distribute the stress according to the AC voltage signal cyclically to the available electrical potentials or to theft switching elements. Depending on the type of AC voltage or taking into consideration the frequency, a corresponding distribution of the thermal stress can be achieved. The stress capacity of the multilevel energy converter or inverter, in particular of its switching elements, can thus be further improved.

What is more it is proposed that an amplitude and/or a frequency of the AC voltage signal is set as a function of a thermal time constant of the switching elements. This enables particular characteristics of the switching elements and also of the multilevel energy converter or inverter as a whole to be better taken into consideration. In this way the frequency of the AC voltage can be chosen for example so that a temperature increase of a respective switching element is as small as possible. Thermal time constants of the switching elements can also be taken into consideration for example.

The AC voltage can be a sinusoidal AC voltage. Especially advantageously however it involves a trapezoidal AC voltage or the like. There can also be provision for other signal forms for the AC voltage to be employed, in order to be able to achieve the most favorable possible distribution of the stress. Naturally these embodiments can also be combined with one another. The combining can comprise the signal shape being switched if necessary, for example in a predefined time frame, depending on the detected temperatures of the switching elements, and/or the like. The signal shape of the AC voltage can be variable, for example dependent on a detected stressing of the switching elements, an operating state of the multilevel energy converter and/or the like.

Preferably the AC voltage signal is a trapezoidal AC voltage signal. This embodiment is suitable in particular when for example, with a three-point inverter, the midpoint path can be constructed more weakly in respect of its stress capacity than the other paths. With an inverter of this type operation according to the prior art can therefore rapidly lead to great stress on the switching elements of the midpoint voltage path that are accordingly dimensioned small. Choice of the trapezoidal AC voltage signal here enables the unfavorable stress for the midpoint path to be better distributed to the other paths. Overall the signal shape of the AC voltage signal can naturally also be chosen adapted to the construction of the multilevel energy converter or inverter in order to better take into consideration different layouts of switching elements. This can naturally also comprise a respective cooling of the switching elements.

The advantages and effects specified for the inventive method naturally also apply for the inventive control unit, the inventive multilevel energy converter and also the inventive drive facility and vice versa. Accordingly apparatus features can also be formulated for method features and vice versa.

BRIEF DESCRIPTION OF THE DRAWING

Further features, advantages and effects emerge from the description given below of exemplary embodiments with the aid of the figures. In the figures the same reference numbers refer to the same features and functions.

In the figures.

DETAILED DESCRIPTION OF PREFERRED EMBODIMENTS

Figure 1:
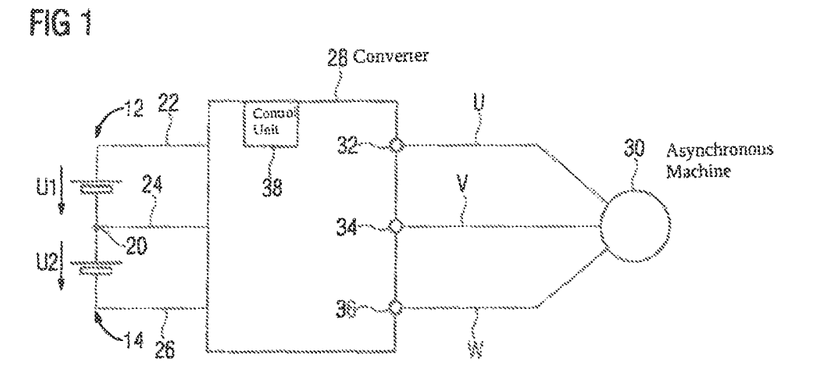
FIG. 1 shows a schematic circuit diagram of a drive facility with a three-phase asynchronous machine, which is connected to a three-point inverter.

FIG. 1, in a schematic circuit diagram, shows a drive facility 10 in accordance with the invention, which comprises a three-phase asynchronous machine 30, which has respective phases U, V, W. The drive facility 10 further comprises a three-point inverter 28 connected to the three-phase asynchronous machine 30 as a multilevel energy converter, which uses three electric potentials 22, 24, 26. The three-point inverter 28 has phase connections 32, 34, 36, to which the phases U, V, W of the asynchronous machine 30 are connected.

The three-point inverter 28 is further connected to a first DC link circuit 12 and to a second DC link circuit 14, which are electrically coupled to one another at a connection point 20. Through this the electrical potentials 22, 24, 26 are provided for the three-point inverter 28. The DC link circuits 12, 14 provide respective DC link voltages U1, U2, which in the present example are approximately equal in size. Depending on requirements they can differ from one another however.

In operation according to specification the DC link circuits 12, 14 are coupled in terms of energy by means of the inverter 28 to the asynchronous machine 30. In the present example there is provision for a bidirectional exchange of energy to be made possible, so that the asynchronous machine 30 can be operated in four-quadrant mode. The asynchronous machine 30 can thus be operated both as an electric motor and also as an electric generator. With the inverter 28 the corresponding energy coupling to the DC link circuits 12 and 14 is established. For its operation according to specification the three-point inverter 28 comprises a control unit 38, which is coupled for communication purposes to a higher-ranking controller of drive facility 10 not shown. However in other embodiments the control unit 38 can also be embodied at least partly in one piece with the higher-ranking controller of the drive facility 10.

Figure 2:
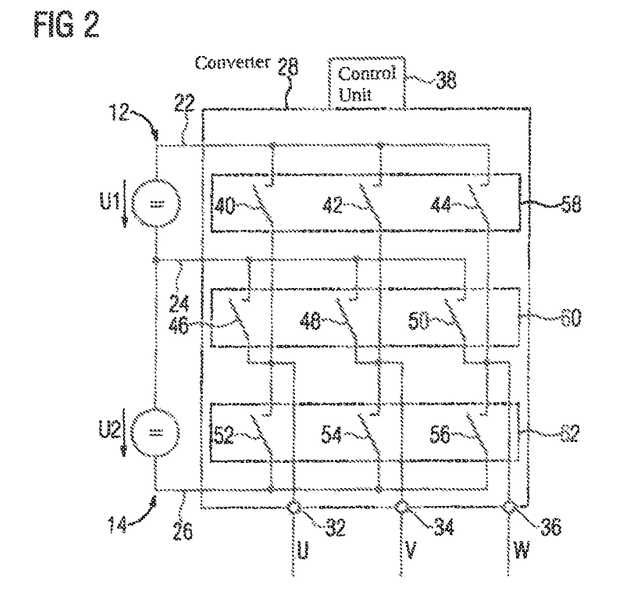
FIG. 2 shows a schematic circuit diagram of the three-point inverter in accordance with FIG. 1.

FIG. 2, in a further schematic circuit diagram, shows a basic layout of the three-point inverter 28. The three-point inverter 28 comprises three switching arrangements 58, 60, 62, which comprise respective switching elements 40 to 56. In this way the switching arrangement 58 comprises the switching elements 40, 42, 44. The switching arrangement 60 comprises the switching elements 46, 48, 50. The switching arrangement 62 comprises the switching elements 52, 54, 56. The switching elements 40, 42, 44 of the switching arrangement 58 are each connected with one of their connections to the electric potential 22. Accordingly the switching elements 46, 48, 50 of the switching arrangement 60 are each connected with one of their connections to the electric potential 24. Finally the switching elements 52, 54, 56 are each connected with one of their connections to the electric potential 26. The switching elements are formed in the present examples by IGBTs.

The second connections of the switching elements 40, 46, 52 are each connected to phase connection 32, the second connections of the switching elements 42, 48, 54 are each connected to phase connection 34 and the second connections of the switching elements 44, 50, 56 are each connected to phase connection 36.

Through the aforementioned circuit topology each of the phase connections 32, 34, 36, depending on the switching state of the respective switching elements 40 to 56, can be electrically coupled to one of the respective electrical potentials 22, 24, 26. The switching elements 40 to 56 electrically coupled to one of the respective phase connections 32, 34, 36 are electronically locked in relation to each other as a rule, so that they cannot assume the switched-on switching state at the same time. This enables short circuits between the electrical potentials 22, 24, 26 to be avoided.

Figure 5:
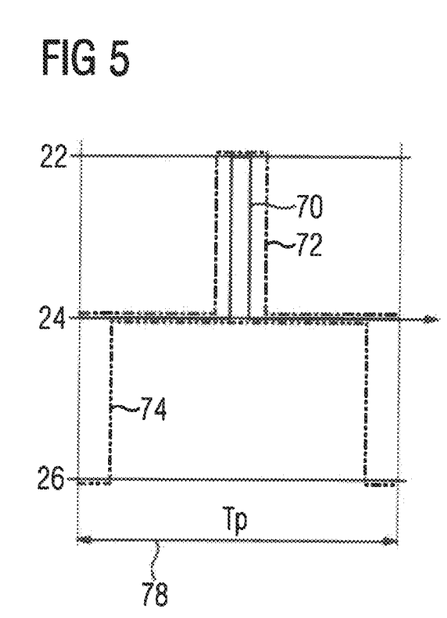
FIG. 5 shows a schematic diagram of output voltages at phase connections of the inverter in accordance with FIG. 2, which have been determined in accordance with FIG. 4.

The three-point inverter 28 further comprises the control unit 38, which serves to control the switching elements 40 to 56 in a predefined clock mode, for which purpose it creates respective switching signals, in order to provide output voltages 70, 72, 74 at the respective phase connections 32, 34, 36 (FIG. 5). In the present example the switching signals are created in accordance with a pulse width modulation, as will be explained in greater detail below.

Figure 3:
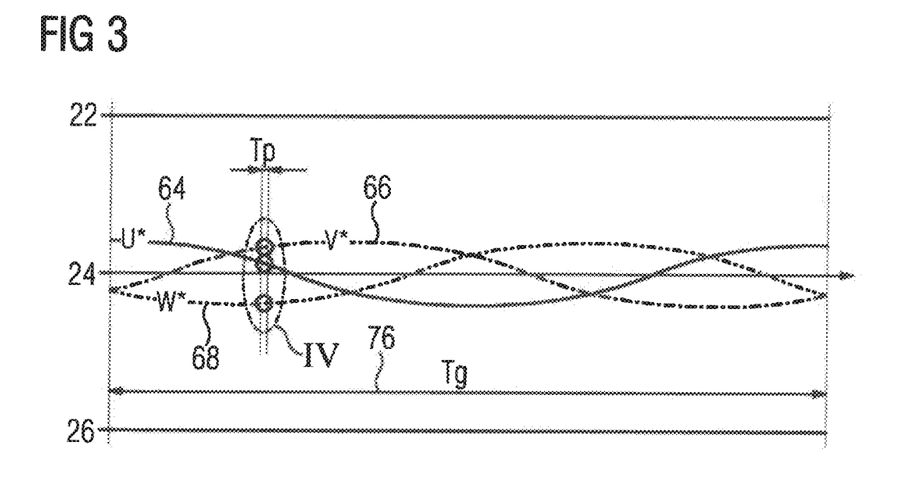
FIG. 3 shows a schematic diagram of desired voltage signals for phase voltages at phase connections of the inverter in accordance with FIG. 2 for a small voltage amplitude.

FIG. 3, in a schematic diagram, shows desired voltage signals 64, 66, 68, which are available for the pulse width modulation for creation of respective phase voltages 70, 72, 74 at the respective phase connections 32, 34, 36. An ordinate is assigned to the electrical potential, while an abscissa is assigned to the time. In the diagram in accordance with FIG. 3 a period of the basic oscillation of the desired voltage signals 64, 66, 68 is shown by means of a graph 76. The desired voltage signals 64, 66, 68 are each out-of-phase in relation to one another, and in the present example this is by 120°.

It can be seen from FIG. 3 that a voltage amplitude of the desired voltage signals 64, 66, 68 is comparatively small, which is why a midpoint path of the three-point inverter 28, which is formed by the switching arrangement 60, is stressed especially heavily. This operating state occurs with the present drive facility 10 when the asynchronous machine 30 is operated at low speed. Usually the voltage amplitude of one of the respective desired voltage signals 64, 66, 68 is roughly proportional to the frequency of the basic oscillation. This affects the inverter 28 by the corresponding switching arrangement 60 and here in particular its switching elements 46, 48, 50 being especially thermally stressed at a small basic oscillation voltage.

Figure 4:
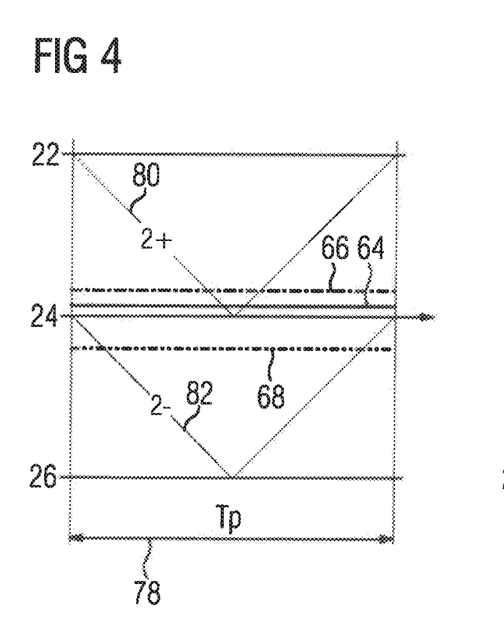
FIG. 4 shows a temporally enlarged sectional diagram of the area IV in FIG. 3.

FIG. 4 shows a temporally enlarged diagram of an area IV in FIG. 3. Reference numbers 64, 66, 68 show corresponding desired voltage signals for the phase voltages 70, 72, 74 (FIG. 5), as are processed by the control unit 38. In order to create the switching signals for the phase voltages 70, 72, 74 in accordance with the pulse width modulation, the desired voltage signals 64, 66, 68 are each fed to respective comparators of the control unit 38 not shown, which compare these signals with corresponding delta signals, which are shown in FIG. 4 by the graphs 80, 82. The graph 80 shows a delta signal for desired voltage signals 64, 66, the potentials of which are between the electrical potentials 22, 24. The graph 82 shows a delta signal, which serves to compare desired voltage signals such as the desired voltage signal 68 in accordance with FIG. 4, which is between the potentials 24, 26.

The comparison operation produces corresponding switching signals for the phase voltages 70, 72, 74, as are shown in FIG. 5. These switching signals lead to corresponding phase voltages at the phase connections 32, 34, 36. In FIGS. 4 and 5 a single clock period of the clock rate of the switching signals is shown by a graph 78 in each case. The ordinate here is again assigned to the electrical potentials, while the abscissa is assigned to the time.

Figure 6:
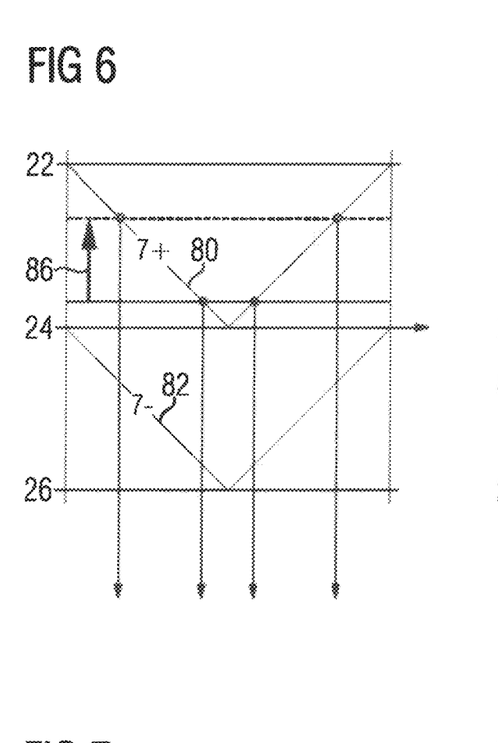
FIG. 6 shows a schematic diagram like FIG. 4 for a selected phase of the phases, wherein the effect of an overlaying voltage is shown for a displacement in the direction of a plus potential.

FIG. 6, in a schematic diagram like FIG. 4, shows the circumstances for an individual phase of the phases, in the present example for the phase U, when an overlaying voltage is overlaid by means of an overlaying voltage signal 86 (FIG. 20) on the comparison function during the switching signal generation. As can be seen from FIG. 6, the switching times of the switching signal are produced for the phase voltage 70 taking into consideration the periods of time t3, t4, as is shown with the aid of FIG. 7, which shows a corresponding diagram in accordance with FIG. 5. Through the action of the overlaying voltage because of the overlaying voltage signal 86 the periods of time are displaced, so that the switching times are now determined with the aid of the times t5, t6, as is shown by means of the switching signal for the phase voltage 108. The middle electrical potential at the corresponding phase connection 32 is thereby displaced.

Figure 7:
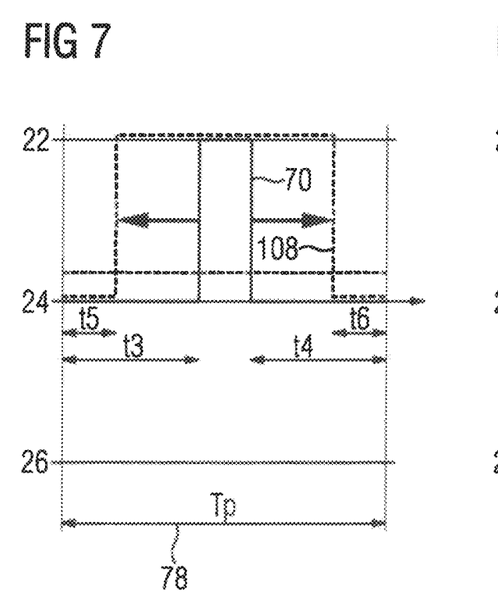
FIG. 7 shows a schematic diagram like FIG. 5 for an output voltage at the phase connection in accordance with FIG. 6.
Figure 8:
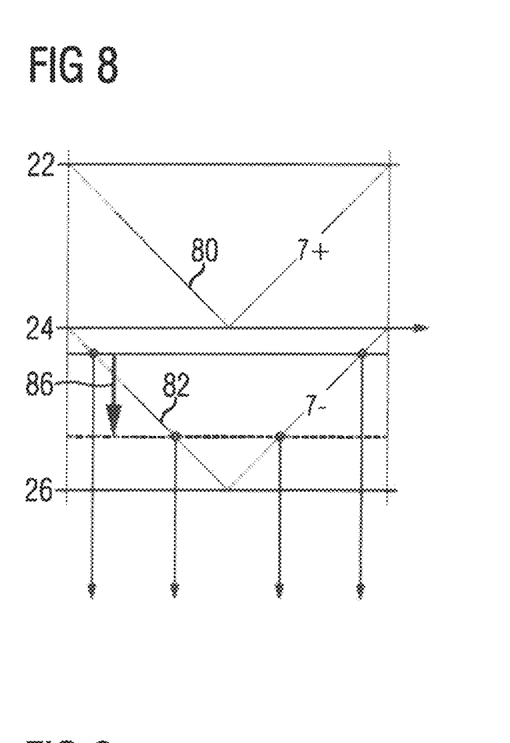
FIG. 8 shows a schematic diagram like FIG. 6 for a negative output voltage at the phase connection, wherein the effect of an overlaying voltage for a displacement in the direction of a minus potential is shown.
Figure 9:
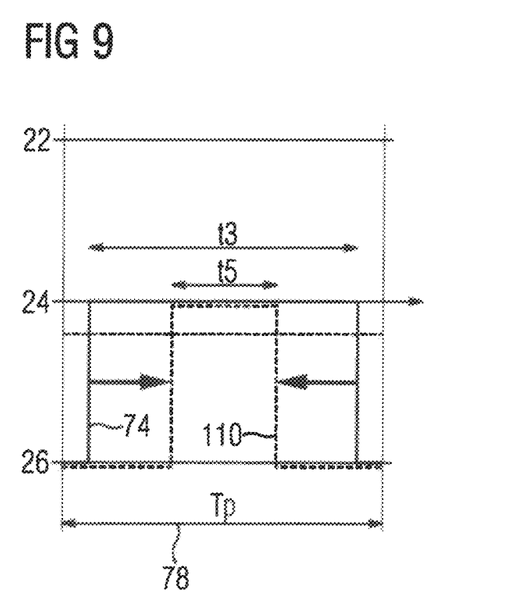
FIG. 9 shows a schematic diagram like FIG. 7 for the determination of the output voltage in accordance with FIG. 8.

FIGS. 8 and 9 show in accordance with FIGS. 6 and 7 the circumstances for the case in which the desired voltage signal has a current instantaneous potential between the electrical potentials 24 and 26. The overlaying voltage signal 86 leads here to a negative overlaying voltage. Accordingly the periods of time in accordance with FIG. 9 are displaced. In FIGS. 8 and 9 this is shown for the phase W. Accordingly FIG. 9 shows the phase voltage 74 without the action of the overlaying voltage signal 86, while FIG. 9 shows the situation for the phase voltage 110 when affected by the overlaying voltage signal 86.

Since the overlaying voltage signal 86 for the phases U, V, W is the same in the present example (FIG. 20), this has the effect to the extent that at the phase connections 32, 34, 36 the desired voltage signals 64, 66, 68 are each displaced by an equal amount. For the asynchronous machine 30 this has no effect since only the linked voltages are relevant for operating the asynchronous machine 30.

The overlaying voltage on the other hand has the effect that the midpoint path of three-point inverter 28 is less stressed. Thus not only are the switching elements of the switching arrangement 60 less heavily stressed, but the stress can be distributed by this to the switching elements of the other switching arrangements 68, 62. The switching elements 40 to 56 can thereby be more evenly stressed as a whole, whereby the reliability is increased and the aging can be reduced. What is more the stress capacity of the three-point inverter 28 overall can be increased.

Figure 10:
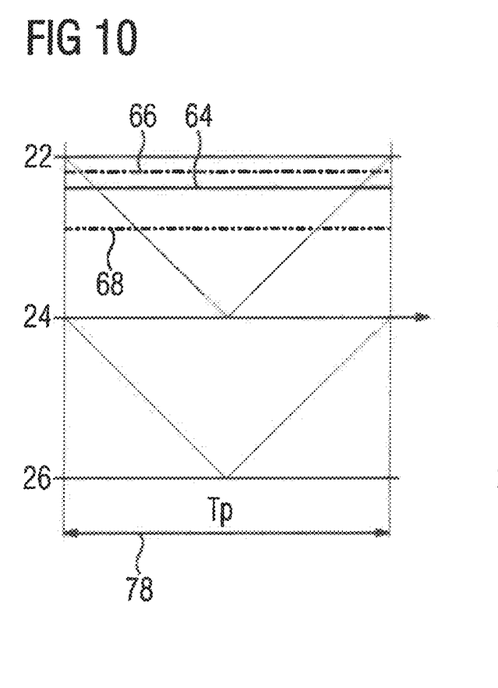
FIG. 10 shows a schematic diagram like FIG. 4, in which the phase voltages are overlaid by an overlaying voltage for a displacement to the plus potential.
Figure 11:
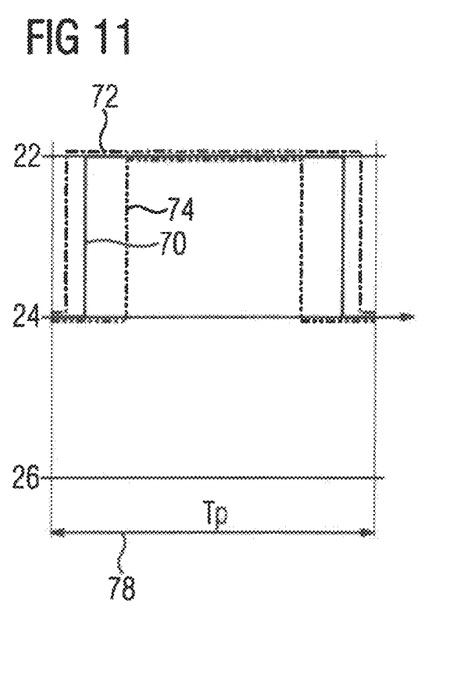
FIG. 11 shows a schematic diagram like FIG. 5 for the switching signals for corresponding switching signals in accordance with FIG. 10.
Figure 12:
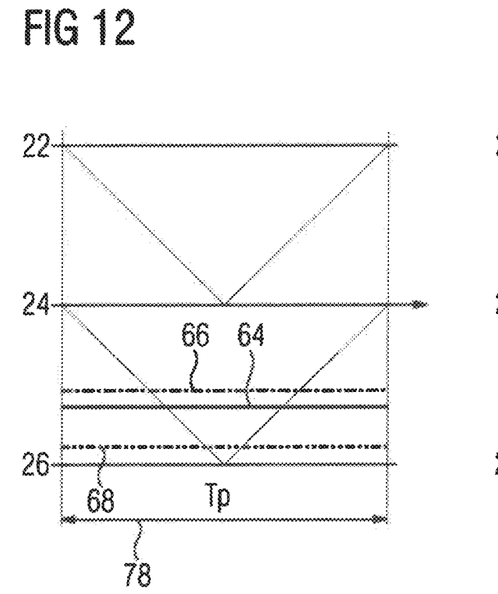
FIG. 12 shows a schematic diagram like FIG. 10, wherein now the overlaying voltage causes a displacement to the minus potential.
Figure 13:
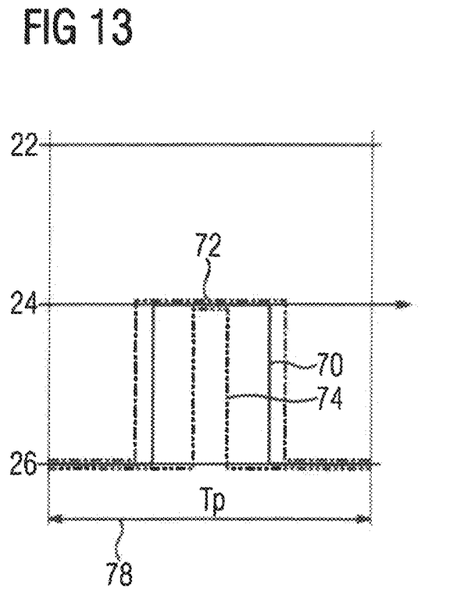
FIG. 13 shows a schematic diagram like FIG. 11 for the scenario in accordance with FIG. 12.

FIGS. 10 and 11, in schematic diagrams like FIGS. 4 and 5, show the circumstances when a large overlaying voltage is overlaid on the respective desired voltage signals 64, 66, 68. FIG. 11 shows the corresponding phase voltages 70, 72, 74. FIGS. 12 and 13 show a corresponding situation, in which the overlaying voltage is negative, meaning that the electrical potentials of the desired voltage signals 64, 66, 68 are between the electrical potentials 24, 26. The corresponding phase voltages 70, 72, 74 are shown in FIG. 13.

Figure 14:
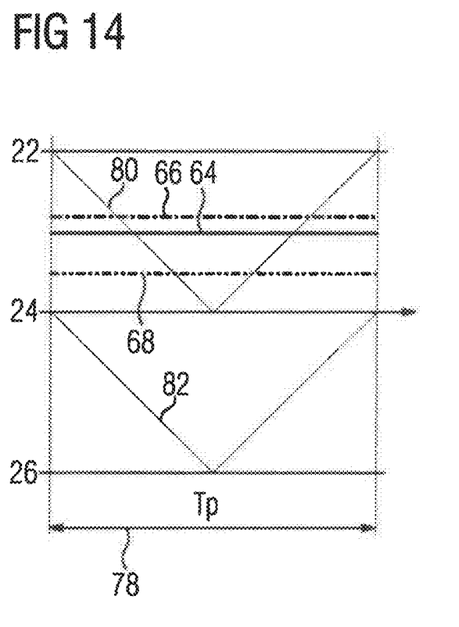
FIG. 14 shows a further schematic diagram like FIG. 10, in which the overlaying voltage is smaller than with the embodiment in accordance with FIG. 10.
Figure 15:
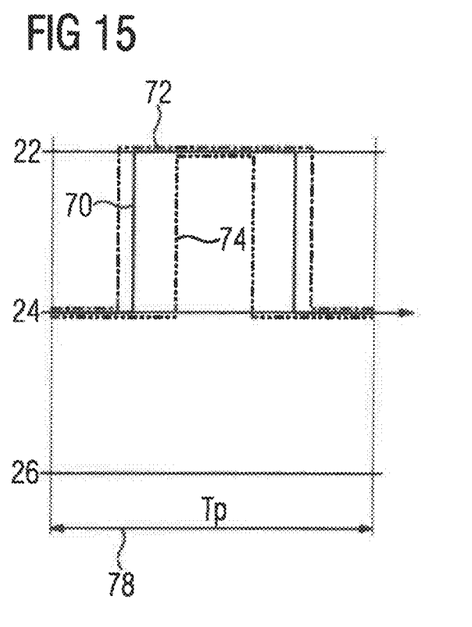
FIG. 15 shows a schematic diagram of the switching signals for the scenario in accordance with FIG. 14.

With FIGS. 14 and 15 an intermediate value of the overlaying voltage is shown, from which it can be seen that the overlaying voltage can also continuously change, whereby the stress on the switching elements 40 to 56 can then likewise be changed, preferably continuously. FIGS. 14 and 15 thus represent an intermediate value, as has already been explained for the scenarios in accordance with FIGS. 10 to 13.

Figure 16:
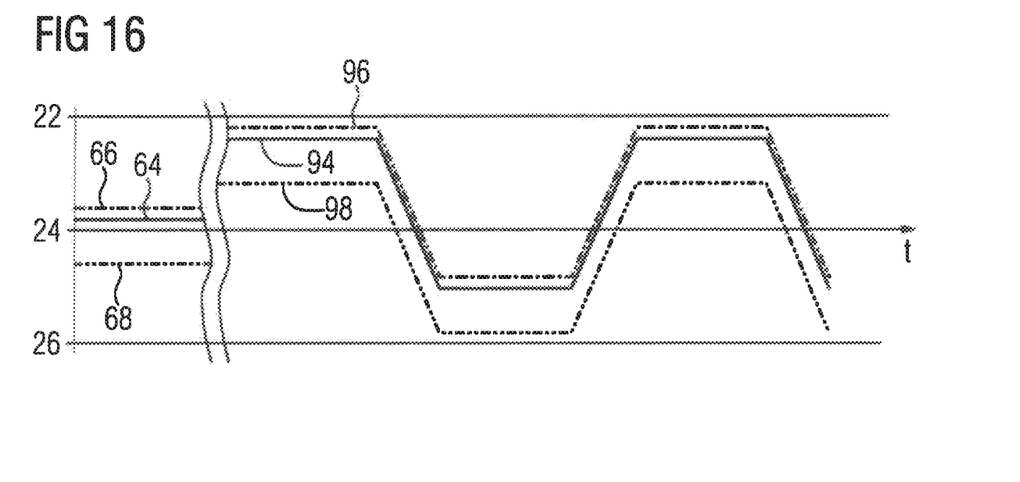
FIG. 16 shows a schematic diagram for individual overlaying voltages for the phase voltages in accordance with a first embodiment.

FIG. 16 shows the desired voltage signals 64, 66, 68 overlaid by an overlaying voltage signal 86, which is trapezoidal, by means of corresponding graphs 94, 96, 98, as they can change over time as a result of the overlaying voltages. In the present example the overlaying voltages are formed by trapezoidal AC voltages, the frequency of which is greater than the frequency of the phase voltages 64, 66, 68. The overlaying AC voltage signal 86 is thus trapezoidal here for example.

Figure 17:
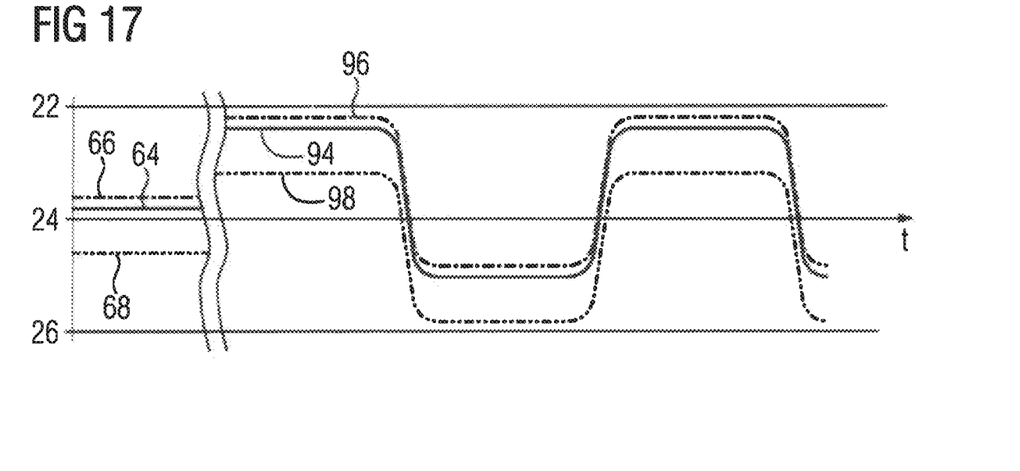
FIG. 17 shows a schematic diagram like FIG. 16 for a second embodiment.

FIG. 17 shows a corresponding schematic diagram like FIG. 16, in which the overlaying voltage signal 86 has a roughly rectangular signal form, wherein the corners are rounded.

Figure 18:
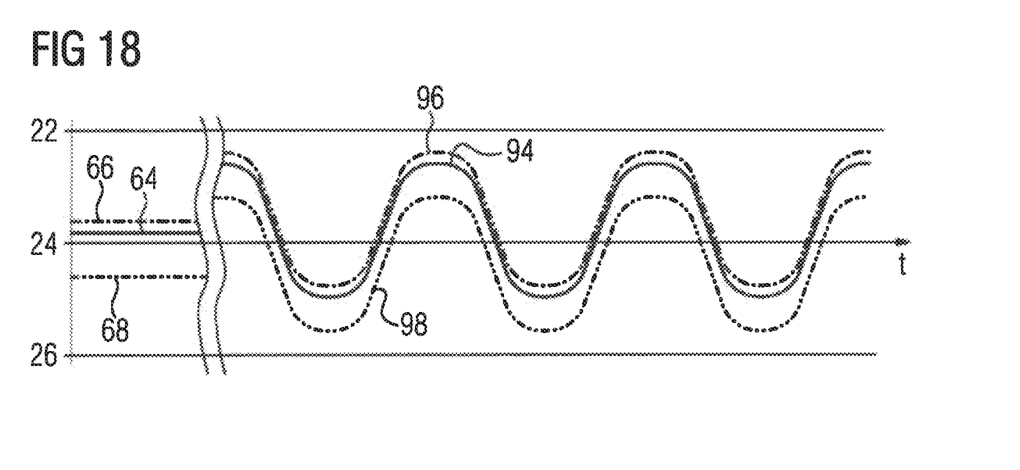
FIG. 18 shows a schematic diagram like FIG. 16 for a third embodiment.

FIG. 18, in a further embodiment, shows the overlaying voltage as a result of an overlaying voltage signal 86, which has a roughly sinusoidal signal form.

The frequency of the overlaying AC voltage signals does not need to be constant. It can naturally be varied as required, for example also be dependent on the construction of the three-point inverter 28, an instantaneous stress state and/or the like.

In the diagrams in accordance with FIGS. 16 to 18 the abscissa is assigned, to the time in each case, while the ordinate is assigned to the electrical potential.

Figure 19:
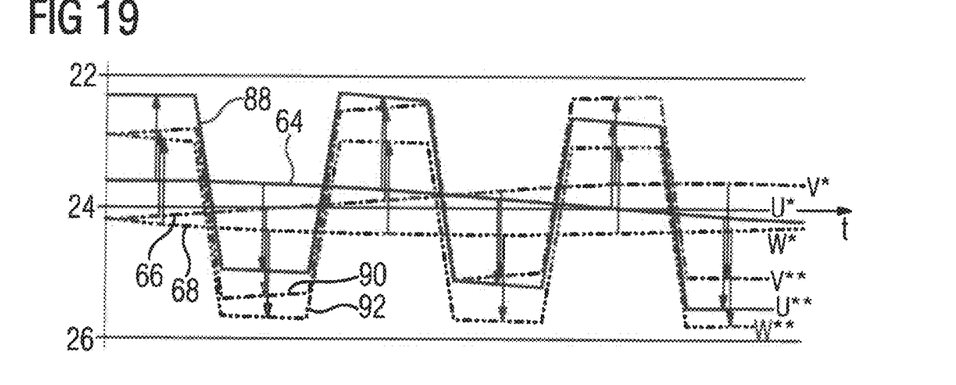
FIG. 19 shows a schematic diagram of phase voltages overlaid by the overlaying voltages.

FIG. 19, in a further schematic diagram, shows the timing curves of the desired voltage signals 64, 68, 66 as well as the curves of the respective desired voltage signals overlaid by the overlaying voltage with corresponding assigned graphs 88, 90, 92, as is shown hi accordance with FIG. 16. It can be seen that all of the desired voltage signals 64, 66, 68 are out-of-phase according to the overlaying voltage signal 86, so that the corresponding switching arrangements 58, 60, 62 are more evenly stressed.

Figure 20:
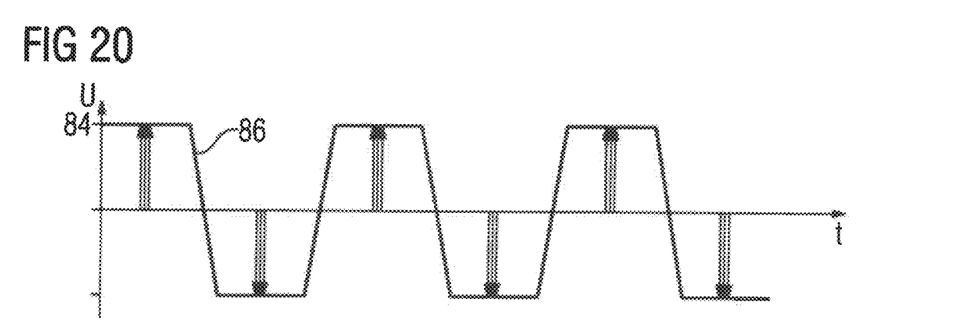
FIG. 20 shows a schematic diagram of overlaying voltage signals in accordance with FIG. 19.

FIG. 20, in a voltage-time diagram, shows the corresponding overlaying voltage signal 86, which has an amplitude 84.

The following advantages can be achieved with the invention:

With a small frequency of the basic osculation of the desired voltage signals, the permissible current of the switching elements can be increased, With electrical machines the maximum torque is already available at a low speed, A ripple current and thus a heating up and noise generated by the electrical machine can be reduced, Common mode currents and faults caused thereby in the area of electromagnetic compatibility can be reduced with the same parasitic capacitances.

As a rule the current stress capacity of the entire inverter or multilevel energy converter is limited by the switching element in which the highest temperature occurs. With displacement of all phase voltages by the same amount the linked voltages remain the same, so that effects on the electrical machine are negligible.

At the same time however the distribution of the forward power losses to the various switching elements of the multilevel energy converter can be influenced. By relocating the losses away from the maximally stressed switching element to other switching elements, its temperature can be reduced for the same current. The maximum permissible temperature of this switching element is therefore only reached at a higher current.

Particularly advantageous is the fact that the displacement of the desired voltage signals can be carried out constantly and that this can result in a likewise constant change in the distribution of the losses. Despite possible differences between the forward power and cooling characteristics of the switching elements, this allows their losses or their maximum temperature to be balanced out. The ripple current can be reduced because no clocking gaps are needed. The definitive frequency for the ripple current remains double the pulse frequency for example over the entire period of the basic oscillation.

Common mode currents are as a rule proportional to a capacitance in the common mode circuit and to the speed of change of a common mode voltage. This can be very large when the clocking gap is used, because, as a rule, it corresponds to the switching speed of the switching elements and said elements should switch as quickly as possible to achieve small switching losses. In the method described here in accordance with the invention on the other hand the speed of change of the common mode voltage is decoupled from the switching behavior of the switching elements and is able to be freely set.

Because of the freely-selectable division of the losses between the switching elements a lower temperature of the switching elements overall and a more even stress on the switching elements can be achieved. The lower thermal stress on individual switching elements can lead to a higher reliability with the current remaining the same. Conversely, with the same maximum permissible temperature, a larger current can be achieved, so that a performance increase is possible.

The first DC link circuit 12 provides the first DC link voltage U1 and the second DC link circuit 14 provides the second DC link voltage U1. In the present example the first and the second DC link voltage U1, U2 are of equal size. Depending on the application however there can also be provision for the first and the second DC link voltage to differ from one another.

Figure 21:
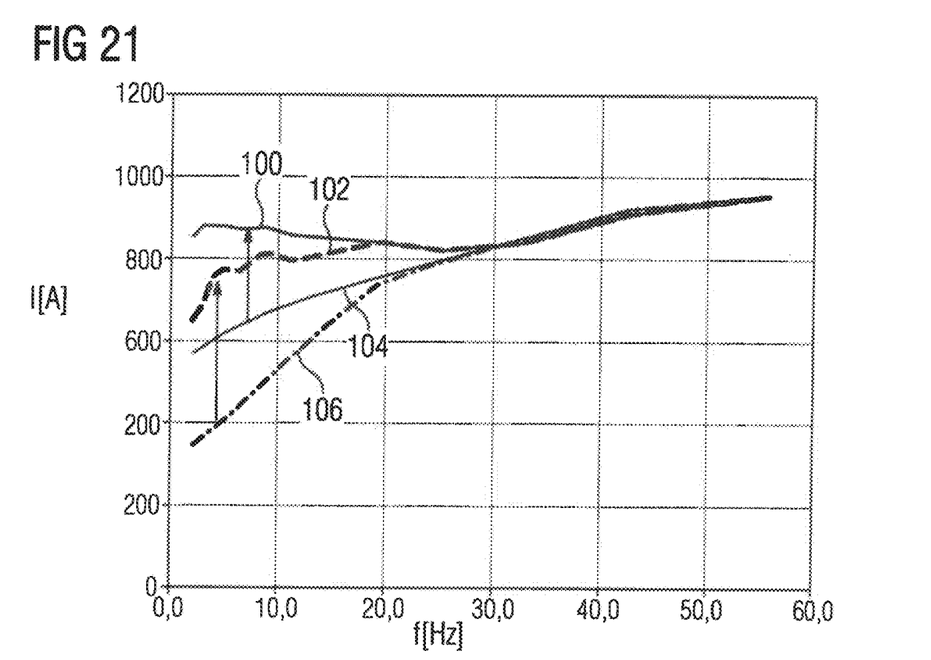
FIG. 21 shows a schematic diagram, in which by means of graphs for different frequencies of the basic oscillation of the phase voltages, a current stress capacity of the switching elements is shown.

FIG. 21, in a schematic diagram, shows the effects that can be achieved with the inventive operating method. The abscissa is assigned to the frequency, while the ordinate is assigned to the electrical current.

Maximum current stress capacities of the switching elements 40 to 56 and thus also of the multilevel energy converter or the three-point inverter 28 are represented by the graphs 100, 102, 104, 106 shown in FIG. 21.

A graph 104 shows a derating for operation according to specification, without an overlaying voltage being used, wherein a temperature ripple remains unconsidered. With the aid of the graph 104 it can be seen that, with decreasing frequency the permissible current stress capacity also decreases. Graph 106 shows the situation for the case in which the maximum permissible junction temperature of one of the respective switching elements 40 to 56 in conjunction with a temperature ripple permissible for the predetermined lifetime is shown. The temperature ripple relates to an increase in temperature during a period of the basic oscillation of the desired voltage signals 64, 66, 68. The longer the overload times are, the greater is to be the provision for a derating. This can be shown with the aid of the graphs 104 and 106.

The graphs 100 and 102 now accordingly show the situation when using an overlaying voltage. In this case, in respect of the operating conditions, the graph 100 is assigned to graph 104 and the graph 102 to graph 106. It can be seen that the use of the overlaying voltage enables the stress capacity of the multilevel energy converter or three-point inverter 28 to be markedly increased, and for this to be done in particular in the range of frequencies that are less than around 30 Hz. Depending on the construction of the multilevel energy converter or of the three-point inverter 28 this can also vary however, because the effect of the invention can also be dependent inter glia on how the construction of the multilevel energy converter or of the three-point inverter 28 is implemented in reality.

The exemplary embodiments serve exclusively to explain the invention and are not intended to restrict said invention.

The invention claimed is:

1. A method for operating switching elements of a multilevel energy converter using at least three electric potentials, said method comprising:
   connecting phases of a multiphase electrical machine to the multilevel energy converter;
   operating the switching elements of the multilevel energy converter in a predefined clock mode by corresponding switching signals;
   determining the corresponding switching signals for the switching elements that are assigned to a respective one of the phases of the multiphase electrical machine as a function of a respective desired voltage signal in order to apply a respective phase voltage to each of the phases of the multiphase electrical machine;
   additionally determining the corresponding switching signals as a function of a predefined overlaying AC voltage signal in order to overlay the respective phase voltages with an overlaying voltage dependent on the predefined overlaying AC voltage signal;
   forming the predefined overlaying AC voltage signal to distribute thermal stress cyclically to the at least three electric potentials and the switching elements;
   distributing the thermal stress more evenly to all of the switching elements of the multilevel energy converter by displacement of the respective phase voltages as a result of the overlaying voltage;
   determining temperatures of the switching elements; and
   setting the predefined overlaying AC voltage signal as a function of the determined temperatures.

2. The method of claim 1, wherein the overlaying of the respective phase voltages occurs when a frequency of the respective desired voltage signal is less than a predetermined comparison frequency.

3. The method of claim 1, wherein the overlaying of the respective phase voltages occurs when an amplitude of the respective desired voltage signal is less than a predetermined comparison amplitude.

4. The method of claim 1, further comprising:
   determining aging states of the switching elements; and
   setting the predefined overlaying AC voltage signal as a function of the determined aging states.

5. The method of claim 1, further comprising setting at least one of an amplitude and a frequency of the predefined overlaying AC voltage signal as a function of a thermal time constant of the switching elements.

6. The method of claim 1, wherein the predefined overlaying AC voltage signal is a trapezoidal AC voltage signal.

7. A control unit for controlling switching elements of a multilevel energy converter, said multilevel energy converter using at least three electric potentials and connected to phases of a multiphase electrical machine, said control unit being configured to:
   operate the switching elements of the multilevel energy converter by corresponding switching signals in a predefined clock mode,
   determine the corresponding switching signals for the switching elements assigned to a respective one of the phases of the multiphase electrical machine as a function of a respective desired voltage signal in order to apply a respective phase voltage to each of the phases of the multiphase electrical machine,
   determine the corresponding switching signals additionally as a function of a predefined overlaying AC voltage signal in order to overlay the respective phase voltages with an overlaying voltage dependent on the predefined overlaying AC voltage signal,
   form the predefined overlaying AC voltage signal to distribute thermal stress cyclically to the at least three electric potentials and the switching elements,
   distribute the thermal stress more evenly to all of the switching elements of the multilevel energy converter by displacement of the respective phase voltages as a result of the overlaying voltage,
   determine temperatures of the switching elements, and
   set the predefined overlaying AC voltage signal as a function of the determined temperatures.

8. A drive system, comprising:
   the control unit as set forth in claim 7;
   the multiphase electrical machine; and
   the multilevel energy converter which uses the at least three electric potentials and is connected to the multiphase electrical machine.

9. A multilevel energy converter configured to be connected to a multiphase electrical machine, said multilevel energy converter using at least three electric potentials, said multilevel energy converter comprising:
   switching elements for applying a respective phase voltage to each phase of the multiphase electrical machine, and
   a control unit configured to:
      operate the switching elements of the multilevel energy converter by corresponding switching signals in a predefined clock mode,
      determine the corresponding switching signals for the switching elements assigned to a respective one of the phases of the multiphase electrical machine as a function of a respective desired voltage signal in order to apply the respective phase voltage to each of the phases of the multiphase electrical machine,
      determine the corresponding switching signals additionally as a function of a predefined overlaying AC voltage signal in order to overlay the respective phase voltages with an overlaying voltage dependent on the predefined overlaying AC voltage signal,
      form the predefined overlaying AC voltage signal to distribute thermal stress cyclically to the at least three electric potentials and the switching elements,
      distribute the thermal stress more evenly to all of the switching elements of the multilevel energy converter by displacement of the respective phase voltages as a result of the overlaying voltage,
      determine temperatures of the switching elements, and set the predefined overlaying AC voltage signal as a function of the determined temperatures.

* * * * *